United States Patent
Brown et al.

(10) Patent No.: US 9,682,859 B2
(45) Date of Patent: *Jun. 20, 2017

(54) HYDROGEN, LITHIUM, AND LITHIUM HYDRIDE PRODUCTION

(71) Applicant: Consolidated Nuclear Security, LLC, Reston, VA (US)

(72) Inventors: Sam W. Brown, Knoxville, TN (US); Larry S. Spencer, Knoxville, TN (US); Michael R. Phillips, Harriman, TN (US); G. Louis Powell, Oak Ridge, TN (US); Peggy J. Campbell, Clinton, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 475 days.

This patent is subject to a terminal disclaimer.

(21) Appl. No.: 14/171,801

(22) Filed: Feb. 4, 2014

(65) Prior Publication Data
US 2014/0147376 A1 May 29, 2014

Related U.S. Application Data

(63) Continuation of application No. 13/222,002, filed on Aug. 31, 2011, now Pat. No. 8,679,224.

(51) Int. Cl.
*C01B 3/04* (2006.01)
*B01D 53/22* (2006.01)
*C22B 26/12* (2006.01)
*C01D 15/00* (2006.01)

(52) U.S. Cl.
CPC ............... *C01B 3/04* (2013.01); *B01D 53/22* (2013.01); *C01D 15/00* (2013.01); *C22B 26/12* (2013.01); *Y02E 60/364* (2013.01)

(58) Field of Classification Search
None
See application file for complete search history.

(56) References Cited

U.S. PATENT DOCUMENTS

| | | | | | |
|---|---|---|---|---|---|
| 4,294,435 | A | * | 10/1981 | Matsuno | B01F 13/0809 266/234 |
| 4,692,390 | A | * | 9/1987 | Roy | H01M 8/182 429/479 |
| 5,080,875 | A | * | 1/1992 | Bernauer | C01B 3/0005 422/206 |
| 8,679,224 | B2 | * | 3/2014 | Brown | B01D 53/22 423/646 |

OTHER PUBLICATIONS

Soloveichik et al. (Magnesium borogydride as a hydrogen storage materials: properties and dehydrogenation pathway of unsolvated Mg(BH4)2. International Journal of Hydrogen Energy, 2009, vol. 34, p. 916-928).*

* cited by examiner

*Primary Examiner* — Jie Yang
*Assistant Examiner* — Xiaowei Su
(74) *Attorney, Agent, or Firm* — Luedeka, Neely Group, P.C.; Michael J. Renner, Esq.

(57) ABSTRACT

A method is provided for extracting hydrogen from lithium hydride. The method includes (a) heating lithium hydride to form liquid-phase lithium hydride; (b) extracting hydrogen from the liquid-phase lithium hydride, leaving residual liquid-phase lithium metal; (c) hydriding the residual liquid-phase lithium metal to form refined lithium hydride; and repeating steps (a) and (b) on the refined lithium hydride.

12 Claims, 3 Drawing Sheets

HYDROGEN, LITHIUM, AND LITHIUM HYDRIDE PRODUCTION

CROSS REFERENCE TO RELATED APPLICATION

This application is a continuation of co-pending U.S. patent application Ser. No. 13/222,002, filed Aug. 31, 2011, entitled "Hydrogen, Lithium, and Lithium Hydride Production," the entire contents of which are incorporated by reference herein.

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This disclosure relates to the field of material processing. More particularly, this disclosure relates to hydrogen, lithium and lithium hydride production.

BACKGROUND

Lithium hydride (LiH) is a useful material. It reacts with water to produce hydrogen gas and lithium hydroxide. Although this is a violent reaction, it was used in World War II to provide a lightweight source of hydrogen to inflate signaling balloons. In addition to various applications that require the production of hydrogen, there are many applications that require high purity lithium and many applications that require the production of high purity lithium hydride. Standard methods for production of high purity lithium and high purity lithium hydride are generally expensive. What are needed therefore are safer and more economical means for using lithium hydride to produce hydrogen, and better means for producing high purity lithium and high purity lithium hydride.

SUMMARY

The present disclosure provides various embodiments of hydrogen, lithium, and lithium hydride processing apparatuses. Typically these apparatuses have a hot zone to heat solid-phase lithium hydride to form liquid-phase lithium hydride. A vacuum source is typically provided to extract hydrogen and gaseous-phase lithium metal from the liquid-phase lithium hydride. Embodiments of the apparatuses also typically have a cold zone to condense the gaseous-phase lithium metal as purified solid-phase lithium metal. A heater is typically provided to melt the purified lithium metal in the cold zone and form refined liquid-phase lithium in the hot zone. A moderate zone may be provided and is typically disposed between the hot zone and the cold zone to capture a lithium condensate portion of the gaseous-phase lithium and to return the lithium condensate portion to the hot zone as liquid-phase lithium condensate.

The present disclosure further provides methods of producing hydrogen. The methods typically employ a step "a" of heating lithium hydride to form liquid-phase lithium hydride, a step "b" of extracting hydrogen from the liquid-phase lithium hydride, leaving residual liquid-phase lithium metal, and a step "c" of hydriding the liquid-phase lithium metal. The methods typically involve repeating steps "a" and "b" at least once.

The present disclosure also provides methods of processing hydrogen and lithium material. Methods typically include steps of heating a lithium hydride source material that includes lithium hydride to form liquid-phase lithium hydride. The methods generally also involve reducing an ambient pressure over the liquid-phase lithium hydride. Typically, a further step involves extracting hydrogen and gaseous-phase lithium metal from the liquid-phase lithium hydride. Generally the methods also involve condensing the gaseous-phase lithium metal as solid-phase lithium metal. Then the solid-phase lithium metal may be melted to form refined liquid-phase lithium metal. Some methods may include hydriding the refined liquid-phase lithium metal.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of hydrogen and lithium material processing apparatuses and embodiments of methods of processing hydrogen and lithium material. It is to be understood that other embodiments may be utilized, and that structural changes may be made and processes may vary in other embodiments.

Lithium hydride is a very space-efficient material for the storage of hydrogen. The hydrogen density in lithium hydride is greater than the density of metallic (solid) hydrogen. In other words there is more hydrogen stored in a cubic unit measure of lithium hydride than in the same cubic unit measure of pure metallic hydrogen. This phenomenon provides a potential for the use of lithium hydride as a means of compact storage of hydrogen for use in hydrogen-powered vehicles and other applications where a source of hydrogen on demand is needed.

At atmospheric pressure lithium hydride melts at about 692° C. By reducing the ambient pressure to near vacuum conditions, lithium hydride may be melted at about 680° C. At atmospheric pressure liquid lithium hydride decomposes into lithium metal and hydrogen gas at about 850° C. The temperature at which the decomposition occurs may be lowered to about 750° C. by reducing the ambient pressure over the liquid lithium hydride to near vacuum conditions. These characteristics may be used in thermal processes to generate hydrogen from lithium hydride with relative safety compared with a chemical reaction of water with lithium hydride. Such thermal processes have a further advantage of producing lithium metal instead of the lithium hydroxide that results from the chemical reaction of water with lithium hydride. Typically, many impurities in the lithium hydride are removed during these thermal processes such that a refined lithium metal is produced. In addition, such thermal processes may be extended to economically produce high purity lithium hydride by re-hydriding the refined lithium metal.

Figure 1:
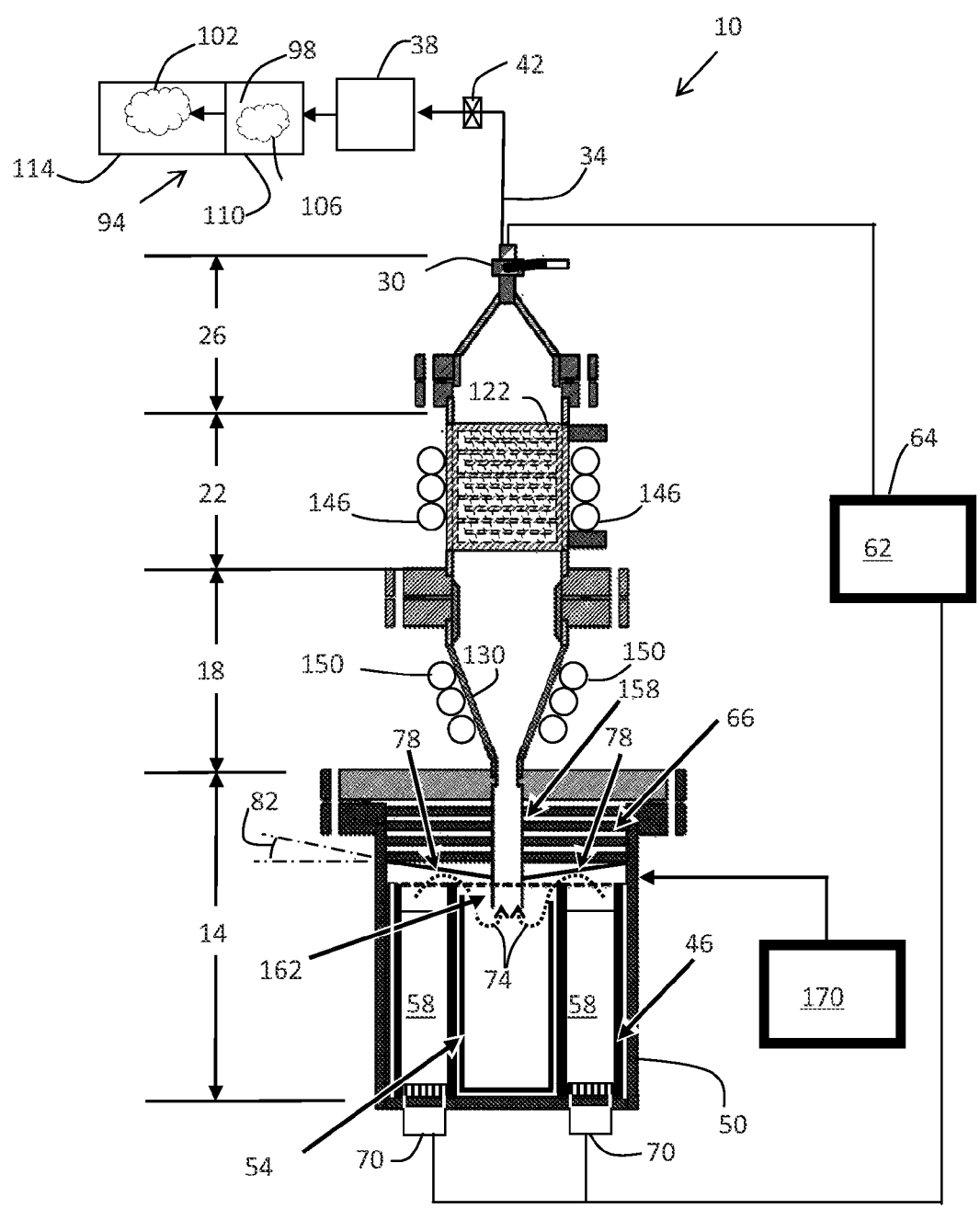
FIG. 1 is a somewhat schematic cross-sectional view of an apparatus for processing hydrogen and lithium materials.

FIG. 1 illustrates an apparatus 10 that may be used to generate hydrogen and lithium metal, as well as to produce high purity lithium and high purity lithium hydride. The apparatus 10 may also be used to store hydrogen and release the stored hydrogen for subsequent use. The apparatus 10 provides a hot zone 14, a moderate zone 18, a cold zone 22, and an extraction zone 26. The apparatus 10 also includes a vacuum system 38 that is connected by an extraction line 34 to the top of the extraction zone 26 through a manifold 30. Typically the vacuum system 38 is an oil-free vacuum pump. A valve 42 is typically provided in the extraction line 34 to permit sealing off the vacuum system 38 from the extraction zone 26.

In the embodiment of the apparatus 10 depicted in FIG. 1 the hot zone 14 includes a shim pot 46 that is disposed within a process vessel 50. A "shim pot" is a double-walled vessel with a space between the walls for containing materials. In the embodiment of FIG. 1, a lithium hydride source material 58 is disposed between the walls of the shim pot 46. In the embodiment of apparatus 10 depicted in FIG. 1, a center can 54 is disposed within the open space formed by the inner wall of the shim pot 46. The shim pot 46 and the center can 54 are preferably constructed from a material such as iron that is compatible with lithium. In some embodiments the shim pot 46 is not used and the lithium hydride source material 58 is disposed between the process vessel 50 and the center can 54. In such embodiments the process vessel 50 is preferably constructed from a material such as iron that is compatible with lithium. In embodiments where a shim pot is used (such as shim pot 46) the process vessel 50 may be constructed from stainless steel, which could be susceptible to erosion if contacted with hot lithium were it not for the protection against such erosion that is provided by the shim pot 46. Typically the shim pot 46, the process vessel 50 and the center can 54 are concentric circular annular shapes.

The lithium hydride source material 58 is substantially lithium hydride, but the lithium hydride source material 58 may include up to ten percent impurities. That is, the lithium hydride content may be in a range from about ninety to one hundred percent of the lithium hydride source material 58.

Typically the operation of the apparatus 10 begins with establishing a flow of purge gas such as argon 62 from a tank 64 through the manifold 30. Then the vacuum system 38 is activated with the valve 42 open. The purge flow tends to reduce the flow of dust from the lithium hydride source material 58 into the vacuum system 38. The process vessel 50 and the shim pot 46 (if used) and the center can 54 are then heated with an appropriate energy source (e.g., electric resistance, induction, natural gas). The hot zone 14 is kept under dynamic vacuum by the vacuum system 38 as the temperature is increased. The term "dynamic vacuum" means that the hot zone 14 is being actively pumped by the vacuum system 38 (i.e., it is not just pumped to vacuum and then valved off, leaving a trapped vacuum condition). This active pumping removes the argon 62 and any off-gasses from the lithium hydride source material 58. Heating continues until the lithium hydride source material reaches at least 680° C., which is a melting temperature of lithium hydride at reduced atmosphere. Radiation baffles 66 are provided in the embodiment of FIG. 1 to reduce the heat loss through the top of the hot zone 14. Even so, when the bottom of the hot zone 14 is at 680° C. the top of the hot zone 14 may only reach 400° C. This is acceptable. Once the lithium hydride source material 58 is melted the flow of purge gas (e.g., argon 62 through the manifold 30) may be discontinued.

As this process proceeds, a barrier crust may form above the liquid-phase lithium hydride in the shim pot 46 (or in the process vessel 50 if the shim pot 46 is not used). The barrier crust is a slag-like material that may be formed from impurities in the lithium hydride, and from lithium hydroxide formed from lithium hydride reacting with trace amounts of water vapor in the apparatus 10, and/or from other contaminants. The barrier crust slows down the evolution of hydrogen from the liquid-phase lithium hydride. To overcome this, FIG. 1 illustrates that the apparatus 10 may include an agitator 70 for retarding the formation of the barrier crust. In some embodiments the agitator 70 may comprise an inert gas sparge, such as a gas sparge using a flow of the argon 62 that was discontinued as a purge gas when the lithium hydride source material 58 melted. Such a sparge flow substantially retards the formation of the barrier crust above the molten phase. In some embodiments the agitator 70 may comprise an energy source having a periodic waveform (such as ultrasonic vibration) that is applied to the bottom of the shim pot 46 to retard the development of a barrier crust. In embodiments that do not employ the shim pot 46, the agitator 70 is applied at the bottom of the process vessel 50 between the process vessel 50 and the center can 54.

Figure 2:
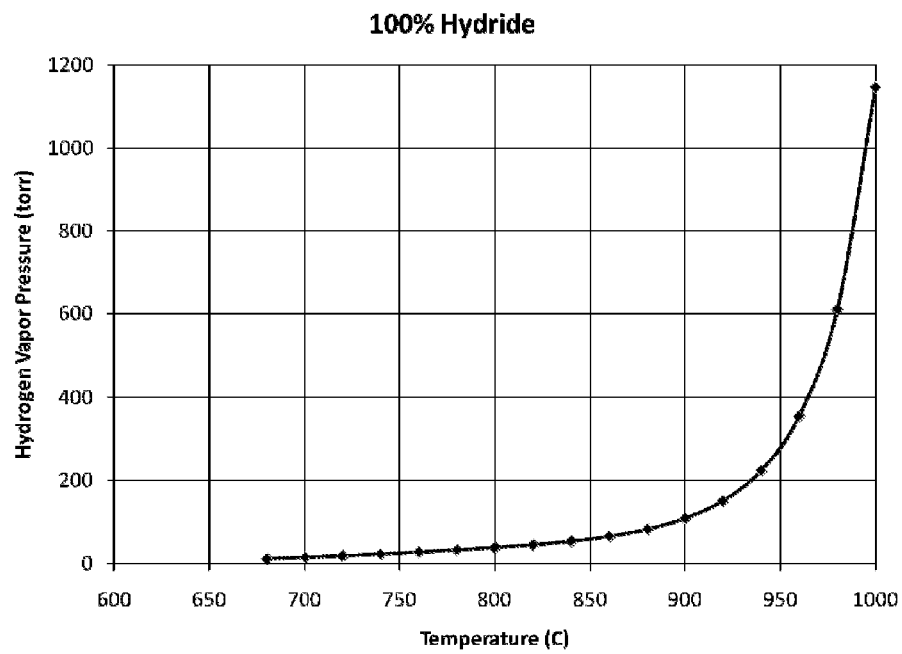
FIG. 2 is a vapor pressure curve for hydrogen in lithium hydride as a function of temperature.
Figure 3:
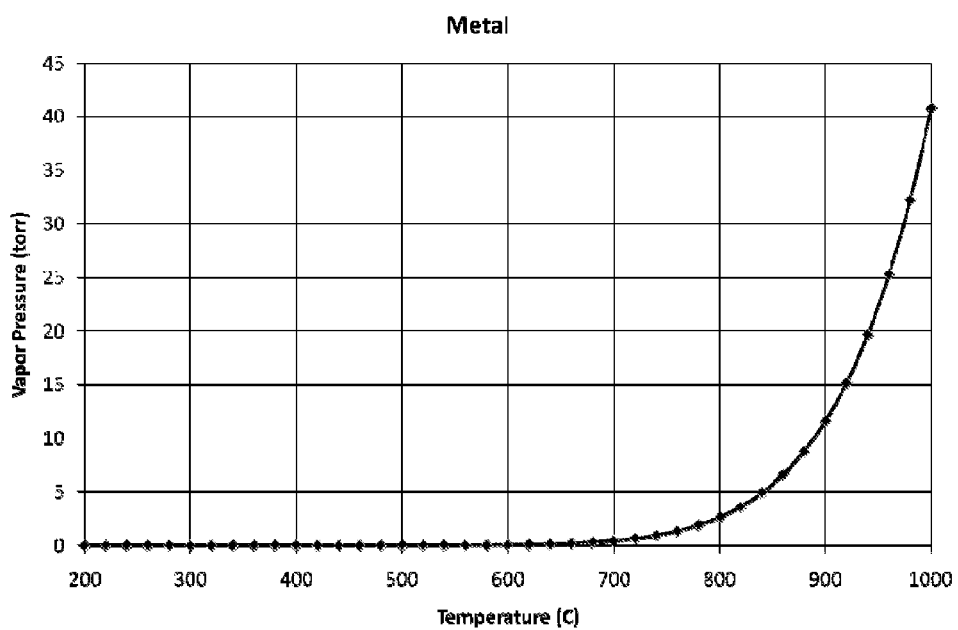
FIG. 3 is a vapor pressure curve for lithium metal as a function of temperature.

After the lithium hydride source material 58 melts, the process vessel 50 and the shim pot 46 (if used) and the center can 54 are further heated such that the lithium hydride source material 58 reaches a temperature of at least 750° C. At that temperature, under near vacuum conditions, the molten lithium hydride decomposes into lithium metal and hydrogen. FIGS. 2 and 3 illustrate the comparative vapor pressures of hydrogen in molten lithium hydride versus the vapor pressure of lithium metal. At any temperature in the range of 700° C. to 1000° C. the vapor pressure of hydrogen from lithium hydride is ten to thirty times higher than the vapor pressure of lithium vapor from lithium metal. Lithium hydride decomposes when the vapor pressure of the hydrogen content is above about 30 torr. This occurs at about 750° C., and at that temperature the vapor pressure of Li from lithium metal is about 1 torr. Consequently, at 750° C., hydrogen is preferentially (almost exclusively) generated, with very little lithium vapor generated. Typically at 750° C., hydrogen generation occurs as fast as it can be pumped until all of the lithium hydride in the lithium hydride source material 58 has decomposed to lithium metal and hydrogen.

As the lithium hydride decomposes into hydrogen and lithium metal, the vacuum system 38 pulls the hydrogen along paths 74 through the moderate zone 18. In embodiments where an inert gas sparge is employed, the vacuum system 38 also pulls the inert sparge gas through the moderate zone 18 and the cold zone 22.

The hydrogen (and inert sparge gas, if present) flows out of the vacuum system 38 into an accumulator 94. Certain impurities may also be pulled into the accumulator 94. A hydrogen membrane filter 98 (such as a side stream palladium filter) may be used to extract hydrogen 102 (which is substantially pure after filtration) and store it in a hydrogen storage compartment 114. The hydrogen 102 may be piped out of the hydrogen storage compartment 114 for use in a fuel cell process or for use in other devices or chemical processes. If an inert gas sparge (such as the argon 62) is used, recovered inert gas 106 may be temporarily stored in an inert gas storage compartment 110. The recovered inert gas 106 may then be returned to the tank 64 and reused.

The just-concluded description of extraction of hydrogen from the lithium hydride source material completes the process application steps needed for some embodiments. In such embodiments the apparatus 10 may be reused for multiple repetitive operations by re-hydriding the lithium that remains in the hot zone 14. To do this, the hot zone 14 with the refined lithium metal in the process vessel 50 is heated to a temperature of about 800° C. (if it is not already at that temperature). Then hydrogen (at approximately 16 psia) is introduced into the hot zone 14 from a source of hydrogen 170, and the lithium metal is converted to lithium hydride. With this approach the apparatus 10 provides a reusable, high density hydrogen storage device. In such embodiments the apparatus 10 may be simplified by eliminating the shim pot 46 and eliminating elements described and discussed later herein such as the inclined deflector 78, the elements in the moderate zone 18, and the elements of the cold zone 22.

In some embodiments it is desirable to purify the liquid-phase lithium metal that remains in the process vessel 50 after extraction of the hydrogen from the lithium hydride. To do this, the process vessel 50 and the shim pot 46 (if used) and the center can 54 are further heated to about 900° C. At that temperature the vacuum system 38 is able to extract gaseous-phase lithium metal from the liquid-phase lithium in the hot zone 14. An inclined deflector 78 may be provided to keep molten gaseous-phase lithium metal from weeping to the sides of the radiation baffles 66, and falling back into the space between the shim pot 46 and the center can 54. The deflector 78 is typically inclined at an angle 82 that is at least 12 degrees. In embodiments where the shim pot 46, the process vessel 50, and the center can 54 are annular, the deflector 78 is generally conical-shaped. The use of the sparge gas (e.g., the argon 62) encourages the formation of lithium vapor, and because the lithium vapor is relatively heavy the sparge gas helps to float the lithium vapor up to the top and out of the liquid lithium where it is pulled by the vacuum system 38 into the cold zone 22.

The cold zone 22 typically includes a chiller 122, such as a counter flow gas to gas heat exchanger. The gaseous-phase lithium metal pulled into the cold zone 22 solidifies as solid-phase lithium metal in the cold zone 22. Some of the gaseous-phase lithium metal vapors passing through the moderate zone 18 may condense back to liquid-phase lithium metal in the moderate zone 18 before reaching the cold zone 22. This condensed liquid-phase lithium metal (lithium metal condensate) flows by gravity back down through the funnel-shaped portion 130 of the moderate zone 18 to the center can 54 in the hot zone 14. Upon its return to the process vessel 50 the condensed liquid-phase lithium metal is again converted to gaseous-phase lithium metal. Eventually all gaseous-phase lithium metal vapors pass through the moderate zone 18 and condense in the cold zone 22 where the lithium metal is trapped in the solid phase.

Figure 4:
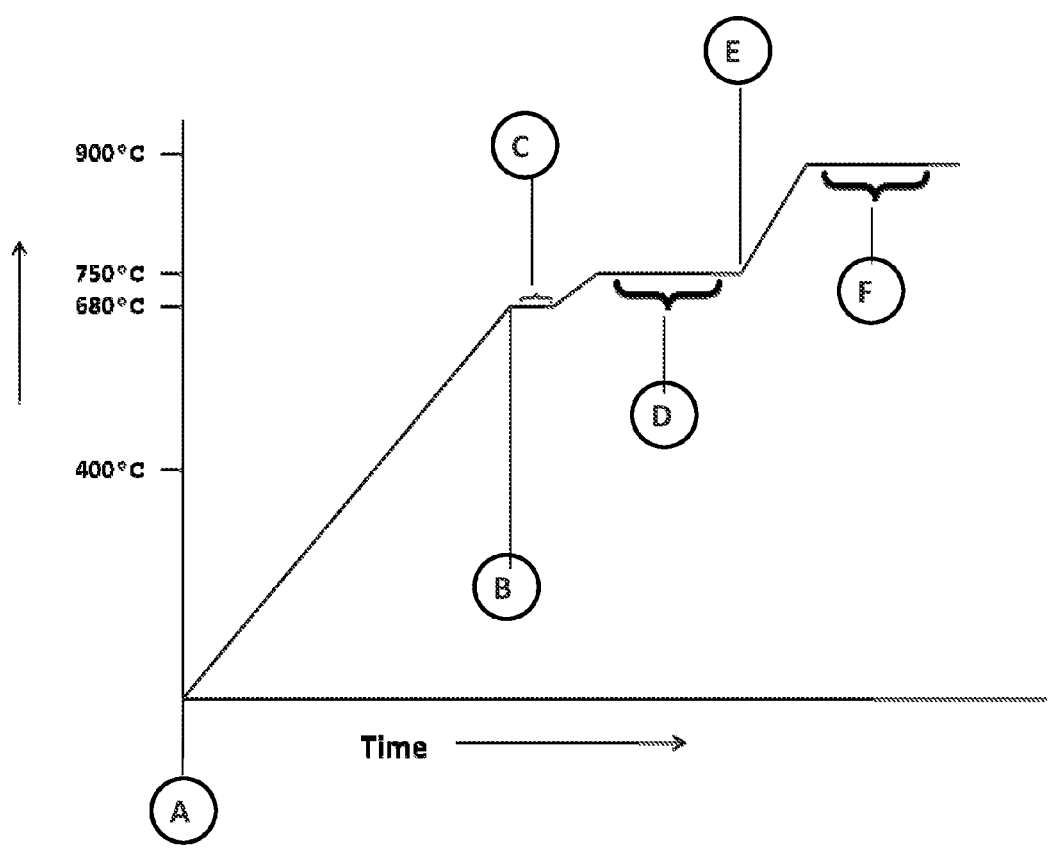
FIG. 4 is an exemplary temperature profile for extracting hydrogen from lithium hydride and purifying the resultant lithium.

FIG. 4 presents a summary of an exemplary temperature profile that may be used to extract hydrogen and lithium metal from the lithium hydride source material 58. The process starts at point "A" where the process vessel 50 is heated and argon 62 is introduced as a purge gas through the valve 42. When the lithium hydride source material 58 reaches a temperature of about 680° C. (at point "B") and is molten, the flow of argon 62 is switched to a sparge gas through the agitator 70. During the time interval "C" the lithium hydride becomes molten. The temperature of the molten lithium hydride is then increased to about 750° C. and during time interval "D" the lithium hydride decomposes to lithium and hydrogen, and the hydrogen is pumped away. When the lithium hydride decomposition is complete (at time "E") the molten lithium is further heated to about 900° C. where, during time interval "F," the lithium metal vaporizes and is frozen in the cold zone 22.

Upon completion of the thermal decomposition of lithium hydride and the deposit of the solid-phase lithium metal in the cold zone 22, the gas pressure in the device approaches full vacuum (provided that the inert gas sparge, if used, is turned off). At that point, the valve 42 to the vacuum system 38 may be closed and the apparatus 10 may be cooled, typically by simply turning off power to the apparatus 10.

The highly purified lithium metal that has condensed in the cold zone 22 may be extracted by using heaters 146 to heat the cold zone 22 to a temperature above 180° C., the melting temperature of lithium metal. Supplemental heaters 150 may be applied to the moderate zone 18. The purified liquid-phase lithium metal runs down into the center can 54 of the hot zone 14 (which is now cold) through a cylinder 158, thereby providing refined lithium metal. The cylinder 158 has an end 162, and it beneficial to have the end 162 of the cylinder 158 terminate at an elevation that is below the top of the center can 54.

As previously noted, the apparatus 10 may be recharged for repetitive operations by re-hydriding the refined lithium in the hot zone 14 such that the refined lithium metal is converted to refined lithium hydride. Alternately, the vapor distilled, ultra-high purity refined lithium metal may be removed from the process vessel 50 under inert conditions for other uses. In some embodiments the apparatus 10 is used as a reiterating lithium or lithium hydride refining device, and in such embodiments the source of hydrogen 170 may include hydrogen 102 extracted from a prior decomposition of lithium hydride.

In addition to various embodiments of apparatuses, the present disclosure provides methods of processing hydrogen and lithium material. The methods typically involve heating a lithium hydride source material that includes lithium hydride to form liquid-phase lithium hydride. The lithium hydride source material is heated to a temperature that is typically in the range of 750° C. to 800° C. to form a liquid-phase lithium hydride. A reduced ambient pressure over the liquid-phase lithium hydride (such as provided by a vacuum pump) extracts hydrogen and gaseous-phase lithium metal from the liquid-phase lithium hydride as the lithium hydride decomposes. The reduced ambient pressure also has a benefit of reducing the decomposition temperature of the lithium hydride. Typically the gaseous-phase lithium metal is condensed as solid-phase lithium metal. Sometimes a lithium condensate portion of the gaseous-phase lithium may be captured and returned to the lithium hydride source material as liquid-phase lithium condensate. The solid-phase lithium metal may be extracted from the cold zone by melting to form refined lithium metal, and the refined lithium metal may be hydrided using hydrogen gas to form a re-charged lithium hydride. The previously-described process steps for decomposing lithium hydride may then be repeated one or more times using recharged lithium hydride as the lithium material.

Some processes may involve retarding the formation of a barrier crust that may form adjacent the liquid-phase lithium hydride. This retarding step may involve sparging the liquid-phase lithium hydride with an inert gas such as argon, and/or it may involve agitating the liquid-phase lithium hydride with an energy having a periodic waveform, such as ultrasonic energy.

In summary, embodiments disclosed herein provide a hydrogen and lithium material processing apparatus and methods of processing hydrogen and lithium materials. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of producing hydrogen comprising:
   (a) providing lithium hydride in a process vessel;
   (b) heating the lithium hydride in the process vessel to form liquid-phase lithium hydride;
   (c) extracting hydrogen from the liquid-phase lithium hydride, leaving residual liquid-phase lithium metal in the process vessel, the hydrogen being extracted from the process vessel and used in a fuel cell process or used in other devices or chemical processes outside the process vessel;
   (d) hydriding the residual liquid-phase lithium metal in the process vessel to convert the residual liquid-phase lithium metal to liquid-phase lithium hydride; and
   repeating steps (c) and (d) to provide a reusable hydrogen storage device.

2. The method of claim 1 wherein the heating temperature in step (b) is at least 680° C.

3. The method of claim 2 wherein step (c) includes heating the liquid-phase lithium hydride to at least 750° C. to extract hydrogen from the liquid-phase lithium hydride.

4. The method of claim 1 further comprising providing an agitator in the process vessel to retard the development of a barrier crust from forming during step (b).

5. The method of claim 4 wherein the agitator includes an inert gas sparge.

6. The method of claim 4 wherein the agitator includes an energy source having a periodic waveform.

7. A method of producing a reusable hydrogen storage device comprising:
   (a) providing lithium hydride in a process vessel;
   (b) heating the lithium hydride to form liquid-phase lithium hydride;
   (c) extracting hydrogen from the liquid-phase lithium hydride, leaving residual liquid-phase lithium metal in the process vessel;
   (d) hydriding the residual liquid-phase lithium metal while heating the process vessel to about 800° C. to convert the residual liquid-phase lithium metal to liquid-phase lithium hydride; and
   repeating steps (c) and (d) to provide a reusable hydrogen storage device.

8. The method of claim 7 wherein the heating temperature in step (b) is at least 680° C.

9. The method of claim 8 wherein step (c) includes heating the liquid-phase lithium hydride to at least 750° C. to extract hydrogen from the liquid-phase lithium hydride.

10. The method of claim 7 further comprising providing an agitator in the process vessel to retard the development of a barrier crust from forming during step (b).

11. The method of claim 10 wherein the agitator includes an inert gas sparge.

12. The method of claim 10 wherein the agitator includes an energy source having a periodic waveform.

* * * * *